(12) United States Patent
Possos et al.

(10) Patent No.: US 11,863,755 B2
(45) Date of Patent: Jan. 2, 2024

(54) METHODS AND APPARATUS TO ENCODE VIDEO WITH REGION OF MOTION DETECTION

(71) Applicant: Intel Corporation, Santa Clara, CA (US)

(72) Inventors: Sebastian Possos, Sammamish, WA (US); Ximin Zhang, San Jose, CA (US); Changliang Wang, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 17/560,095

(22) Filed: Dec. 22, 2021

(65) Prior Publication Data

US 2022/0116622 A1     Apr. 14, 2022

(51) Int. Cl.
*H04N 19/124* (2014.01)
*H04N 19/137* (2014.01)
*H04N 19/176* (2014.01)

(52) U.S. Cl.
CPC ......... *H04N 19/137* (2014.11); *H04N 19/124* (2014.11); *H04N 19/176* (2014.11)

(58) Field of Classification Search
None
See application file for complete search history.

(56) References Cited

U.S. PATENT DOCUMENTS

2021/0337205 A1*  10/2021  Lin ..................... H04N 19/176

* cited by examiner

*Primary Examiner* — Christopher G Findley
(74) *Attorney, Agent, or Firm* — Hanley, Flight & Zimmerman, LLC

(57) ABSTRACT

Methods, apparatus, systems, and articles of manufacture are disclosed. Example apparatus disclosed herein are to process features extracted from first and second downscaled image frames to determine block classifications for respective blocks of the first and the second downscaled image frames. Disclosed example apparatus are also to generate a map based on the block classifications, the map including values representative of amounts of change associated with blocks of the second downscaled image frame and corresponding blocks of the first downscaled image frame. Disclosed example apparatus are further to adjust a quantization parameter of a full-scale image frame based on the map, the full-scale image frame corresponding to the at least one of the first or the second downscaled image frames.

17 Claims, 12 Drawing Sheets

FIG. 5A

|        | Col.0 | Col.1 | Col.2 | Col.3 | Col.4 | Col.5 | Col.6 | Col.7 | Col.8 | Col.9 | Col.10 | Col.11 | Col.12 | Col.13 | Col.14 | Col.15 |
|--------|-------|-------|-------|-------|-------|-------|-------|-------|-------|-------|--------|--------|--------|--------|--------|--------|
| Row 0  | 0     | 1     | 0     | 0     | 0     | 1     | 1     | 1     | 1     | 1     | 1      | 1      | 2      | 1      | 1      | 0      |
| Row 1  | 0     | 0     | 0     | 0     | 3     | 4     | 1     | 1     | 1     | 3     | 1      | 2      | 1      | 0      | 0      | 0      |
| Row 2  | 0     | 0     | 0     | 0     | 4     | 1     | 1     | 1     | 1     | 3     | 0      | 2      | 0      | 0      | 0      | 0      |
| Row 3  | 0     | 0     | 0     | 0     | 0     | 1     | 1     | 1     | 1     | 1     | 0      | 1      | 0      | 0      | 1      | 0      |
| Row 4  | 0     | 0     | 0     | 0     | 0     | 0     | 0     | 0     | 0     | 1     | 0      | 1      | 2      | 0      | 0      | 1      |
| Row 5  | 0     | 0     | 0     | 0     | 0     | 0     | 1     | 0     | 0     | 0     | 0      | 0      | 0      | 0      | 0      | 0      |
| Row 6  | 0     | 0     | 0     | 0     | 0     | 0     | 0     | 0     | 0     | 0     | 0      | 1      | 0      | 0      | 0      | 0      |
| Row 7  | 1     | 0     | 0     | 0     | 0     | 0     | 0     | 0     | 0     | 0     | 0      | 1      | 0      | 0      | 0      | 0      |

FIG. 5B

|        | Col.0 | Col.1 | Col.2 | Col.3 | Col.4 | Col.5 | Col.6 | Col.7 | Col.8 | Col.9 | Col.10 | Col.11 | Col.12 | Col.13 | Col.14 | Col.15 |
|--------|-------|-------|-------|-------|-------|-------|-------|-------|-------|-------|--------|--------|--------|--------|--------|--------|
| Row 0  | 0     | 0     | 1     | 1     | 2     | 3     | 2     | 1     | 3     | 2     | 1      | 0      | 0      | 0      | 0      | 0      |
| Row 1  | 1     | 1     | 1     | 1     | 3     | 4     | 1     | 1     | 4     | 2     | 1      | 1      | 0      | 0      | 0      | 0      |
| Row 2  | 0     | 1     | 1     | 1     | 3     | 3     | 4     | 2     | 4     | 2     | 3      | 1      | 1      | 1      | 2      | 0      |
| Row 3  | 0     | 1     | 1     | 1     | 0     | 1     | 1     | 4     | 5     | 1     | 2      | 0      | 2      | 0      | 1      | 0      |
| Row 4  | 0     | 1     | 1     | 1     | 2     | 1     | 5     | 5     | 4     | 0     | 0      | 0      | 0      | 0      | 0      | 0      |
| Row 5  | 0     | 0     | 1     | 0     | 4     | 5     | 5     | 4     | 4     | 0     | 0      | 0      | 0      | 0      | 0      | 0      |
| Row 6  | 0     | 0     | 0     | 0     | 0     | 1     | 0     | 1     | 1     | 0     | 0      | 1      | 0      | 0      | 0      | 0      |
| Row 7  | 1     | 0     | 0     | 0     | 0     | 0     | 0     | 0     | 0     | 0     | 0      | 3      | 3      | 0      | 0      | 0      |

|      | Col 0 | Col 1 | Col 2 | Col 3 | Col 4 | Col 5 | Col 6 | Col 7 | Col 8 | Col 9 | Col 10 | Col 11 | Col 12 | Col 13 | Col 14 | Col 15 |
|------|-------|-------|-------|-------|-------|-------|-------|-------|-------|-------|--------|--------|--------|--------|--------|--------|
| Row 0 | -2 | -2 | 0 | 1 | 1 | 1 | 1 | 1 | 0 | 1 | 0 | -2 | -2 | -2 | -2 | -2 |
| Row 1 | 0 | 0 | 0 | 1 | 1 | 0 | 1 | 1 | 0 | 1 | 0 | 0 | 1 | -2 | -2 | -2 |
| Row 2 | -2 | 0 | 0 | 1 | 1 | 1 | 1 | 1 | 1 | 1 | 1 | 0 | -2 | 0 | 1 | -2 |
| Row 3 | -2 | 0 | 0 | 0 | 1 | 0 | 1 | 1 | 1 | 0 | 1 | 1 | 0 | -2 | 0 | -2 |
| Row 4 | -2 | 0 | 0 | 0 | 1 | 1 | 1 | 1 | 1 | -2 | -2 | -2 | -2 | -2 | -2 | -2 |
| Row 5 | -2 | -2 | 0 | 0 | 1 | 1 | 1 | 1 | 0 | -2 | -2 | -2 | -2 | -2 | -2 | -2 |
| Row 6 | -2 | -2 | -2 | -2 | -2 | -2 | 0 | 0 | -2 | -2 | -2 | 0 | 0 | -2 | -2 | -2 |
| Row 7 | 0 | -2 | -2 | -2 | -2 | -2 | -2 | -2 | -2 | -2 | -2 | 3 | 3 | -2 | -2 | -2 |

FIG. 5C

METHODS AND APPARATUS TO ENCODE VIDEO WITH REGION OF MOTION DETECTION

FIELD OF THE DISCLOSURE

This disclosure relates generally to video encoding and, more particularly, to methods and apparatus to encode video with region of motion detection.

BACKGROUND

In recent years, transmission of video content over networks has substantially increased. Such video content is often transmitted at high resolution, causing significant network congestion. To combat network congestion and reduce transmission costs, providers often encode their video.

Video encoding involves transforming video content to a specialized format for transmission and/or storage. Digitally encoded video uses fewer bits than unencoded video, and allows video content to be efficiently transmitted. Encoded video can be decoded without significantly reducing the video quality. Thus, video encoding is an area of intense industrial interest.

BRIEF DESCRIPTION OF THE DRAWINGS

FIG. 5A is an example region of motion map.

FIG. 5B is an example region of motion map.

FIG. 5C is an example region of motion delta quantization parameter map.

In general, the same reference numbers will be used throughout the drawing(s) and accompanying written description to refer to the same or like parts. The figures are not to scale.

Figure 1:
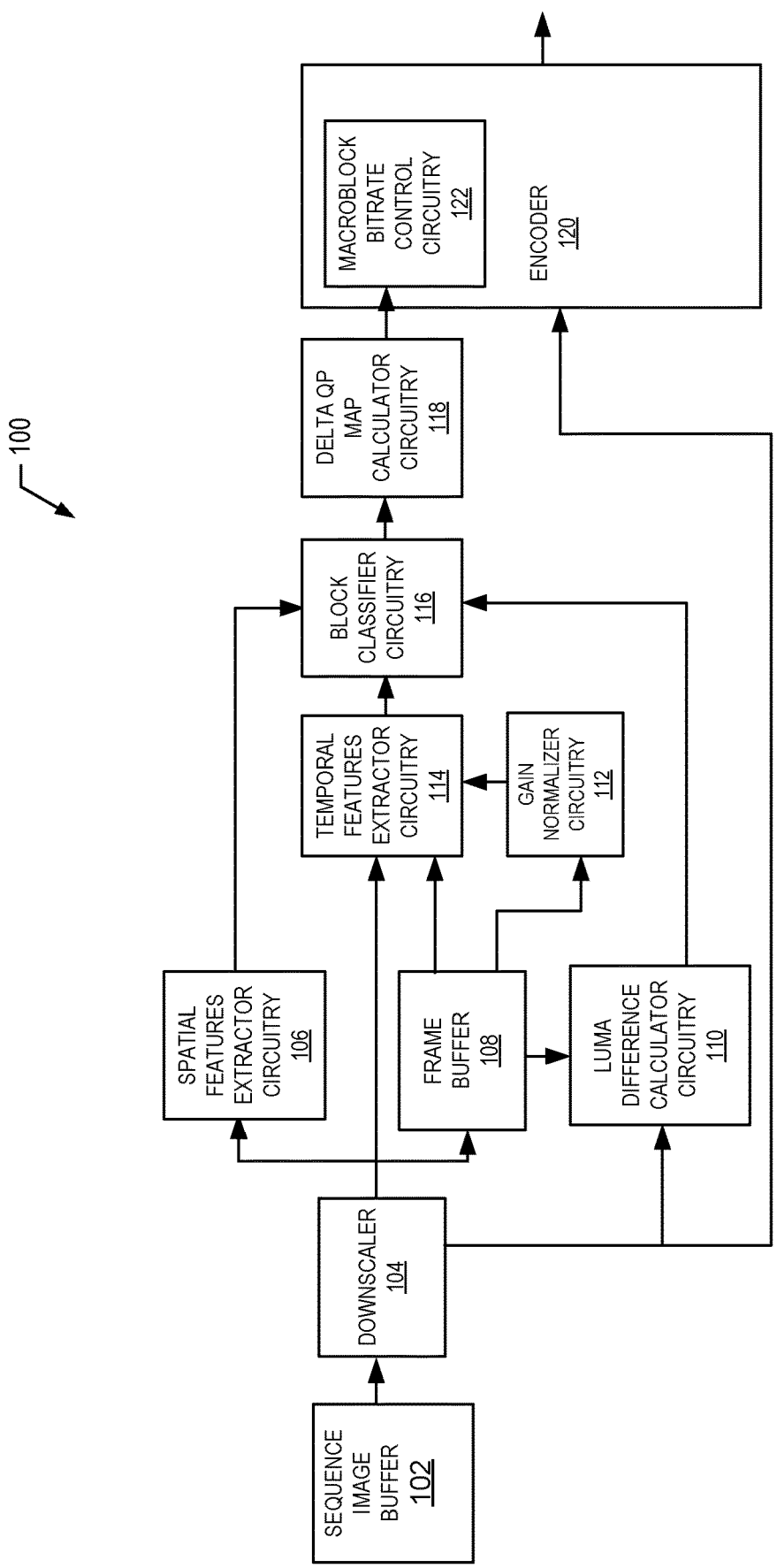
FIG. 1 is a block diagram of an example video encoding system implemented in accordance with teachings of this disclosure.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real-world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Examples disclosed herein improve upon prior video coding pipelines by improving encoded video quality. Some prior video coding pipelines employ a single quantization parameter (QP) for an entire frame (e.g., an image) of a video. Other prior video coding pipelines support determination of respective, individual QPs for different, corresponding macroblocks (e.g., macroblock QP values) of a video frame, but due to the processing involved in determining such individual QP values, they may not be able to account for rapidly changing characteristics of the video (e.g., such as motion. Examples disclosed herein are able to efficiently vary (e.g., adjust) macroblock QP values to account for such changing video characteristics while incurring limited processing overhead. Examples disclosed herein provide an encoder information on region of motion (ROM) and other changes as they relate to blocks (e.g., macroblocks) of video sequences. Thus, rapidly changing blocks can be assigned a high QP, using fewer bits while maintaining perceived video quality. Furthermore, blocks with little change can be assigned a low QP, improving quality for that block. Selecting an appropriate QP for each macroblock can reduce visual artifacts, improve visual quality, and improve bit assignment efficiency.

As described herein, events are defined as an area of correlated variation that happens between consecutive frames. A video sequence, and the frames that make up the video sequence, can include macro and micro events. For example, a macro event may be a camera pan, in which a substantial portion of a frame changes. A micro event includes smaller changes. For example, when a person in a video speaks, the face of the person (e.g., mouth, cheeks, etc.) moves slightly. Such slight movement can be described as a micro event. A video sequence is a collection of continuous frames (e.g., a collection of continuous images).

Frames include multiple macroblocks. The size of each macroblock is selected based on spatial and temporal properties of the image, a type of frame, and encoder constraints. A QP determines how many bits will be used to codify an image and/or part of an image (e.g., a block). Some prior solutions provide a single QP for all macroblocks of an image.

Video encoding involves tradeoffs between bitrate and coding error. Examples disclosed herein provide improved image quality for a given bandwidth. Examples disclosed herein adaptively encode sequences that include events (e.g., micro and macro events) to improve compression efficiency. Some examples disclosed herein determine which areas in the frame have relatively less change and which areas have relatively greater change. By analyzing change within smaller areas (e.g., blocks), some examples disclosed herein can generate improved macroblock QP values.

Some examples disclosed herein adaptively encode sequences based on ROM change. Additionally, or alternatively, examples disclosed herein can adaptively encode sequences based on brightness (e.g., luminance, luma, etc.). Examples disclosed herein include an adaptive video encoding system with region of motion/change detection.

In some examples disclosed herein, analysis of static and/or moving areas of a video improves compression efficiency and visual quality of encoded video. Some examples disclosed herein calculate a ROM and adjust macroblock QP values. In some examples, ROM and delta QP assignment operations are performed before encoding.

Examples included herein improve video encoding and decoding by reducing latency associated with encoding. For example, prior solutions may use more than two (e.g., 5, 10, 50) frames of data in performing ROM analysis. Some examples disclosed herein can perform a ROM analysis and generate improved QP values using just two frames, reducing latency associated with the encoding when compared to prior solutions. The reduced latency is accompanied by a compression efficiency improvement, resulting in better quality. Such benefits are achieved by adaptively assigning different QP values per macroblock in the picture based on spatial and temporal features.

As used herein, the term "coder" refers to an encoder and/or a decoder. Similarly, as used herein, the term "coding" refers to performing video encoding via an encoder and/or performing video decoding via a decoder. For example, a video encoder and video decoder are both examples of coders capable of coding video data. In addition, as used herein, the term "codec" refers to any process, program, set of operations, etc., such as, for example, any combination of software, firmware, and/or hardware, which may implement an encoder and/or a decoder. Further, as used herein, the phrase "motion data" refers to any type of data associated with inter-frame encoding, including, but not limited to, one or more motion vectors, reference indices, inter directions, etc.

In some examples disclosed herein, encoders allocate bits and determine a structure for coding. In some examples, an encoder and/or accompanying circuitry performs a pre-analysis to determine a coding structure and conduct bit allocation to improve rate distortion performance compared to examples that do not include a pre-analysis.

Examples disclosed herein can be used in association with video streaming services, live video streaming services, cloud gaming services, etc. For example, in cloud gaming, low latency is desirable. Examples disclosed herein combine robust and effective pre-analysis and low latency video encoding techniques based on ROM analysis for video sequences to provide a low latency.

Examples disclosed herein analyze ROM and other changes in video sequences. Such analysis allows selection of improved QP values based on a level of change in a ROM. Examples disclosed herein are suitable for use in substantially real time applications due to the efficiency advantages associated with techniques disclosed herein.

In some examples disclosed herein, ROM analysis includes analysis of image and video features (e.g., a video includes images associated over time) and determining interactions between frames (e.g., images) in a video. Some examples disclosed herein determine a correlation between frames in a video sequence, assign a predicted value to specific areas within a video (or video frame) area and communicate the correlation to an encoder that can adjust parameters, operations, models, etc., to improve encoding efficiency.

Some examples disclosed herein include a method for video encoding compression efficiency enhancement using ROM detection. ROM detection (e.g., detection of static/moving areas in video) can improve coding scenarios including video conferencing, remote gaming, low delay encoding, etc. Additional advantages of examples disclosed herein include: enhanced perceptual quality, improved detail retention in relatively static (e.g., slow changing) areas, and fewer bits used to compress areas of high change (e.g., quickly changing).

Further advantages of examples disclosed herein include efficient analysis of down-scaled pictures and interoperability with other software and/or hardware encoders. Furthermore, some examples can integrate with additional software/hardware extensions.

Turning to the figures, FIG. 1 is a block diagram of an example video encoding system 100. FIG. 1 includes an example sequence image buffer 102, an example downscaler 104, example spatial features extractor circuitry 106, an example frame buffer 108, example luma difference calculator circuitry 110, example gain normalizer circuitry 112, example temporal feature extractor circuitry 114, example block classifier circuitry 116, example delta QP map calculator circuitry 118, and an example encoder 120.

The video encoding system 100 obtains a series of video frames, which are stored in the example sequence image buffer 102. Frames are transmitted (e.g., first in first out) to the example downscaler 104 for downscaling. In turn, each downscaled image is analyzed for a variety of spatial and temporal features.

The block classifier circuitry 116 receives the spatial and temporal features (extracted from the downscaled image), feeds the features into pre-trained models, and classifies blocks of the downscaled image, thereby generating a ROM map. The ROM map represents an amount or a level of change or motion of each block of the downscaled image. Based on the ROM map, the delta QP map calculator circuitry 118 generates a delta QP map, which specifies adjustments to be made to initial macroblock QP values already determined for the full-scale image corresponding to the downscaled image. For example, initial macroblock QP values may be generated by the example encoder 120, the example macroblock bitrate control circuitry 122, and/or based on any appropriate video encoding technique. The delta QP map projects the QP changes for each macroblock to the full-scale image.

The example sequence image buffer 102 is memory, storage, etc., designated to store full scale images frames. For example, frames may be stored in the sequence image buffer 102 before being transmitted to the example downscaler 104. The example sequence image buffer 102 contains images before they are transmitted to other elements of the video encoding system 100. For example, the image buffer 102 may be instantiated in volatile memory. In some examples the image buffer 102 may be instantiated in nonvolatile storage, registers, etc. In the illustrated example, the sequence image buffer 102 transmits its stored images to the example downscaler 104. The example downscaler implements any appropriate downsampling technique to resize a digital image (e.g., from 1920×1080 pixels to 256×128 pixels). The example downscaler 104 reduces image size while maintaining (e.g., when possible) the spatial and temporal characteristics of the original image.

In the illustrated example, the example downscaler 104 transmits the downscaled image to the example spatial features extractor circuitry 106, the example temporal feature extractor circuitry 114, the example frame buffer 108, the example luma difference calculator circuitry 110, and the example encoder 120.

The example spatial features extractor circuitry 106 extracts features from the downscaled image, based in part on block spatial complexity (BSC). The structure and operation of the example spatial features extractor circuitry 106 are described in further detail in association with FIG. 2 below.

The example frame buffer 108 stores previous downscaled frame data. Prior frames allow for determination of temporal features and correlations between sequential frames. Although the frame buffer 108 of the illustrated example stores one frame (e.g., for ROM analysis performed using two frames, which include a current/present frame and a previous frame), some example implementations of the frame buffer 108 may store additional frames for use in determining additional temporal features. In the illustrated example, the frame buffer 108 transmits the previous downscaled image/frame to the luma difference calculator circuitry 110, the example gain normalizer circuitry 112, and the example temporal features extractor circuitry 114. In this way, the luma difference calculator circuitry 110, the example gain normalizer circuitry 112, and the example temporal features extractor circuitry 114 can make calculations and/or comparisons based in part on the previous frame data.

The example luma difference calculator circuitry 110 measures the average luminance value of an input downscaled image/frame. The example luma difference calculator circuitry may also be part of the spatial features extractor circuitry 106, as shown and described in association with FIG. 2 below.

The example gain normalizer circuitry 112 normalizes data from the example frame buffer 108. The example gain normalizer circuitry 112 normalizes data by compensating the luma level of the previous frame to match a luma level of the current frame. To normalize the values, the gain normalizer circuitry 112 receives luma values of previous and the current frames and compensates for gain by subtracting a gain difference for each reference pixel. The gain normalizer circuitry 112 is described in further detail below in relation with FIG. 3. In some examples, as the same amount of gain is applied across the image, the micro and macro block characteristics of the previous frame are maintained.

The example temporal features extractor circuitry 114 derives temporal features based on two frames (e.g., a current frame and a previous frame). The temporal features assist in determining a ROM and associated information. If there is no previous frame data, the example temporal features extractor circuitry 114 initializes the temporal features to zero (0) or some other initial value (e.g., indicating beginning of a sequence). The example temporal features extractor circuitry 114 is described in further detail in association with FIG. 3 below.

The example spatial features extractor circuitry 106 extracts feature information from the currently processed frame. The information extracted can include luma level differences between blocks and block spatial complexity. The features are provided to a frame statistics aggregator 206 that prepares the extracted features for the example block classifier circuitry 116. For example, the frame statistics aggregator 206 can collect extracted feature data and order the data into an array. The ordered data can be compared with previous frames and consumed by trained models of the example block classifier circuitry 116.

The example block classifier circuitry 116 receives extracted features from the example temporal features extractor circuitry 114 and the example spatial features extractor circuitry 106. These features are fed to at least one trained model of the example block classifier circuitry 116, the output of the trained models to be classified by a vote accumulator of the example block classifier circuitry 116. The example block classifier circuitry 116 is described in further detail in association with FIG. 4 below.

The example delta QP map calculator circuitry 118 generates a delta QP map based on an output from the block classifier circuitry 116. The delta QP map is generated by calculating an average of a ROM map, reclassifying values of the ROM map based on a set of rules, projecting the change in region of motion to a full-scale image, and adding the change to a rate control module of the encoder 120.

In some examples, the delta QP map calculator circuitry 118 calculates an average index as in the example Equation 1 below:

$$Map_{avg} = \frac{\left(\sum_{\substack{0 \le i \le 16 \\ 0 < j < 8}} Map(i, j)\right) + 64}{128} \quad \text{Equation 1}$$

In Equation 1, i represents a row of a ROM map, j represents a column of a ROM map, Map(i,j) represents a value of a ROM map at location (i, j), 64 is a bias term, and 128 is a normalization term. The Map(i,j) values may range from 0-6, with increasing Map(i,j) values representing increasing motion. For example, a Map(i,j) value of 0 indicates imperceptible/no motion, and a Map(i,j) value of 3 indicates increased motion compared to a Map(i,j) value of 2. The Map(i, j) values correspond to a 16×16 block indexed by (i,j) in the downscaled frame. In Equation 1, an average value of a ROM map is generated by summing the entries of the ROM map, adding a bias, and normalizing.

After an average has been calculated (e.g., operations of Equation 1 are performed), the blocks in the image are reclassified according to the following rules:

(Rule 1) If current image is not a repeated frame (e.g., any activity is detected) and at least one block in the ROM map is not 0, the ROM map is projected to a full-size frame. An example of a ROM map is shown in FIG. 5A below.

(Rule 2) Calculate a region of motion change ($ROM_{delta}$), for each entry in the ROM map as seen in Equation 2 below:

$$ROM_{delta} = \begin{cases} \text{if } (ROM_{value} = 0), \text{ then } \max(-2*Map\_avg, -6) & \text{Equation 2} \\ \text{if } (ROM_{value} < Map_{avg}), \text{ then } -1 \\ \text{if } (ROM_{value} > Map_{avg}), \text{ then } 1 \\ \text{else } 0 \end{cases}$$

In Equation 2, a $ROM_{value}$ is a specific entry in the ROM map. $Map_{avg}$ is defined in Equation 1 above. If the $ROM_{value}$ is 0, then the $ROM_{value}$ is assigned a maximum of (−2*the $Map_{avg}$) and −6. If the $ROM_{value}$ is less than the $Map_{avg}$, then the $ROM_{value}$ is assigned −1. If the $ROM_{value}$ is greater than the $Map_{avg}$, then the $ROM_{value}$ is assigned 1. The ROM delta is calculated for each entry in the ROM map. In some examples, the numeric constants included in Equation 2 are determined empirically based on the encoder characteristics and/or other factors.

(Rule 3) The $ROM_{delta}$ for each entry in the ROM map, taken together, form a delta QP map. In some examples, the delta QP map is added to a picture level QP (e.g., one QP for an entire frame/image) or existing macroblock QPs to obtain an adjusted QP for each block. The adjusted QP can be provided to the example encoder 120.

In some examples, the example encoder 120 may include block motion compensated discrete cosine transform (DCT) based coding circuitry. In some examples, three picture types are defined and used: intra, predicted, and bidirectional. Frames can be arranged on a specific picture structure or group of pictures. The group of pictures structure can be repeated and/or modified based on content in a sequence of video frames. Intra frames (e.g., key frames) are frames based on spatial redundancies (e.g., to compress data). Intra frames are not decoded based on information from past or future frames (e.g., instead used to supply start at intervals of the encoded stream). Predicted frames are frames based on spatial and temporal redundancies to predict and compress image data. Predicted frames use data from past frames to determine temporal redundancies. Predicted frames, in conjunction with intra frames, can function as anchor images for bidirectional frames. Bidirectional frames use spatial and temporal redundancies and leverage temporal affinity with past and future frames. Bidirectional frames typically provide a greater compression ratio than predicted and intra frames.

The example system 100, in operation, first downscales images of the image sequence buffer 102. A frame analysis is then applied to generate a block classification by the block classifier circuitry 116. Based on the block classification map, a delta QP map is generated by the delta QP map calculator circuitry to provide information to the macroblock bitrate control circuitry module 122 for macroblock QP adjustment and subsequent frame encoding.

The system 100 detects and classifies areas of motion/ change. In some examples, spatial and temporal features interfere with each other. Therefore, in some examples, three features are used for ROM change classification (e.g., assigning a level of change to a block). The three features are: block texture strength (BSC), absolute block difference (ABD), and motion compensated block difference (MCBD). In some such examples, the three features are used as inputs of a machine learning module to generate an indexed recommendation for each block. To reduce hardware/software complexity and make the encoding system 100 more efficient, some examples disclosed herein perform ROM classification and QP adjustment based exclusively on a luma layer of a downscaled image of 256×128 pixels.

The example encoding system 100 is based on a low delay architecture, as the encoding system 100 only uses consecutive pairs of frames to classify blocks in images. Additionally, the example encoding system 100 performs ROM detection based at least in part on the luma layer. Although the encoding system 100 performs ROM analysis using the luma layer, any feature or characteristic of an image sequence could be used.

In operation, the example downscaler 104 downscales the luma layer (e.g., using a suitable filter) to generate a downscaled image (e.g., of 256×128 size) for evaluation. For example, the downscaler 104 can send a current downscaled image to the spatial features extractor circuitry 106, which extracts features such as average row-wise and column-wise block differentials, BSC, and average luma frame values. Additionally, in some examples, the current downscaled image, previous downscaled image, and computed spatial features are input to the temporal features extractor circuitry 114. The example temporal features extractor circuitry 114 extracts features based on absolute block difference (ABD) and motion compensated block difference (MCBD). Output of the example temporal features extractor circuitry 114 is provided as input to a set of pre-trained models to assign a level of motion/change per block.

In some examples, the output from the classification includes classes 0 to 6, where 0 indicates substantially no change and 6 means a high level of change. Analysis from a downscaled image (e.g., 256×128 resolution) generates a 2d array of size (e.g., one block of 16×16 pixels generates a 16×8 array), where each element in the array represents a classification of a corresponding block of pixels in the downscaled image. Thus, the example system 100 examines per block spatial and temporal features, determines a relationship between the spatial and temporal features, and (e.g., based on a previous offline analysis of many video sequences), and provides an indexed recommendation to the encoder 120 of a level of change for each block. Then, a delta QP map is generated based on the indexed recommendation statistics. The delta QP map assigns smaller QPs for the blocks with less/no changes and assigns larger QPs for the blocks with greater changes. In other words, the encoder system 100 uses spatial and temporal features in a novel way to determine change in a series of images and adjust macroblock QP parameters.

Figure 2:
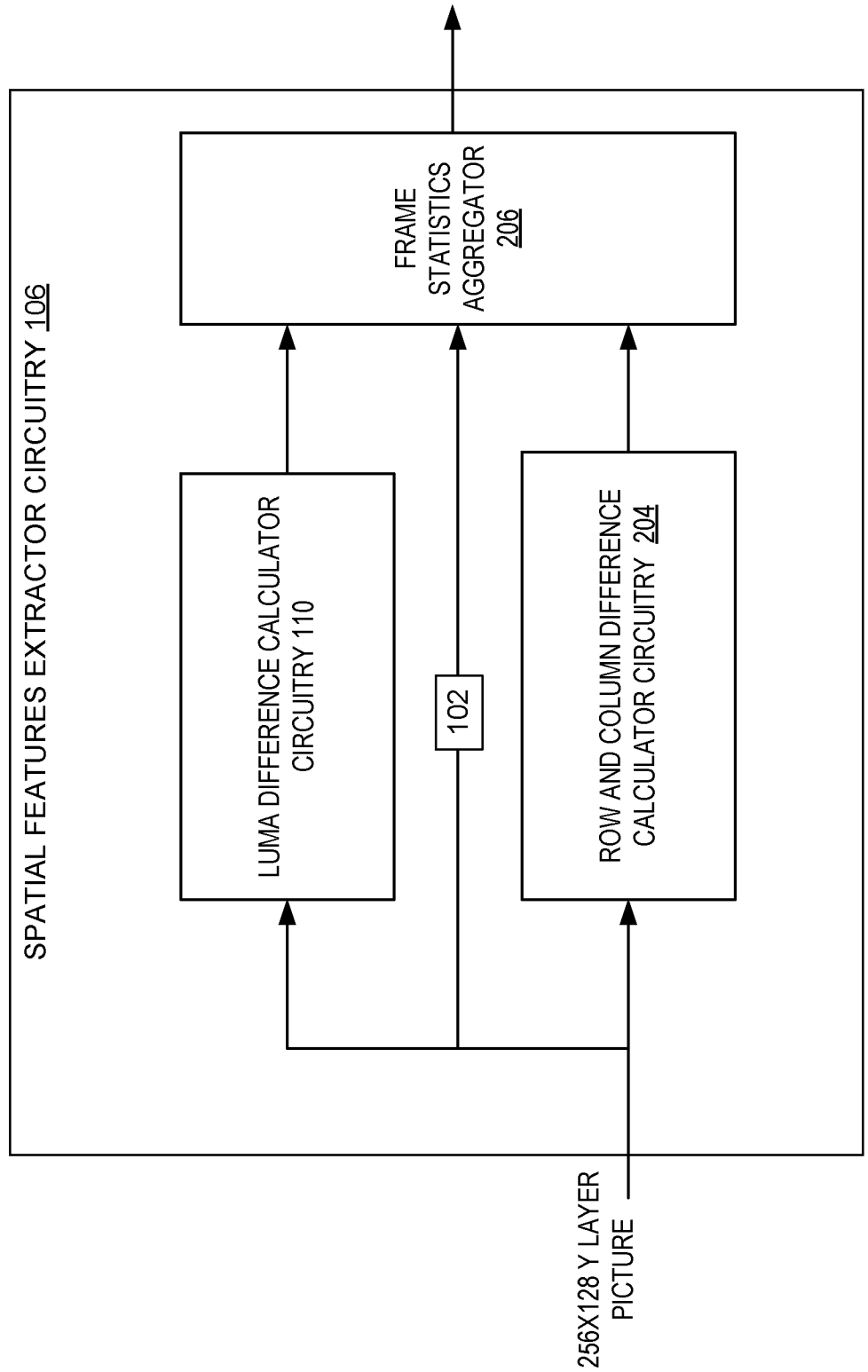
FIG. 2 is a block diagram of example spatial features extractor circuitry included in the video encoding system of FIG. 1.

FIG. 2 is a block diagram of the example spatial features extractor circuitry 106. The example spatial features extractor circuitry 106 of FIG. 2 may be instantiated (e.g., creating an instance of, bring into being for any length of time, materialize, implement, etc.) by processor circuitry such as a central processing unit executing instructions. Additionally or alternatively, the example spatial features extractor circuitry 106 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example spatial features extractor circuitry 106 includes example luma level calculator circuitry 202, example row and column difference calculator circuitry 204, and an example frame statistics aggregator 206. The example luma level calculator circuitry 202 measures the average luminance value of an entire resized (e.g., downscaled) image (e.g., the entire image is treated as one block). The example luma level calculator circuitry 202 may determine an average value of an example 256×128 resolution image according to Equation 3 below.

$$avgLuma = \frac{\sum_{x=0}^{255} \sum_{y=0}^{127} Y(x, y)}{256 \times 128} \qquad \text{Equation 3}$$

In Equation 3, Y is the luma layer of a downscaled image. Thus, Equation 3 sums all the luma values in the downscaled image and normalizes based on the number of pixels in the image.

The example row and column difference calculator circuitry 204 performs a series of calculations to provide specialized information to the example frame statistics aggregator 206. In the example of FIG. 2, the row and column difference calculator circuitry 204 calculates row difference statistics. Row difference is a measure of vertical textures (e.g., vertical spatial arrangement of luma values) corresponding to luma differences between rows of two 16×16 luma blocks, with one luma block shifted one row down with respect to the other. Such differences are divided by a normalization term (e.g., 256), and squared according to Equation 4 below.

$$Rs_{16\times16}(j, i) = \qquad \text{Equation 4}$$
$$\sum_{x=0}^{15} \sum_{y=0}^{15} \left( \frac{Y(j+x, i+y) - Y(j+x, i+1+y)}{256} \right)^2$$

In Equation 4, Rs is a vertical texture measure, i represents a row location within a downscaled luma block, j represents a column location within a downscaled luma block, and Y represents a luma layer of a downscaled (or resized) image. As such, in some examples, a downscaled frame is divided into 16×16 blocks. The calculations of Equation 4 are performed for each block.

As in the row difference calculation, the row and column difference calculator circuitry 204 calculates column difference statistics, where a column difference calculation is done between two 16×16 blocks. However, in a column difference calculation, one block is shifted to the right (e.g., rather than down as in the row difference calculation) according to Equation 5 below.

$$Cs(j, i) = \qquad \text{Equation 5}$$
$$\sum_{x=0}^{15} \sum_{y=0}^{15} \left( \frac{Y(j+x, i+y) - Y(j+1+x, i+y)}{256} \right)^2$$

In Equation 5, Cs is a horizontal texture measure, i represents a row location within a downscaled luma block, j represents a column location within a downscaled luma block, and Y represents a luma layer of a downscaled (or resized) image. As such, in some examples, a downscaled frame is divided into 16×16 blocks. The calculations of Equation 5 are performed for each block. To calculate block spatial complexity (BSC) each block row difference and block column difference are summed as shown in Equation 6 below.

$$BSC_{(i,j)} = BRs_{(i,j)} + BCs_{(i,j)} \qquad \text{Equation 6}$$

In Equation 6, BSC is block spatial complexity (e.g., sum of horizontal and vertical textures), BRs is vertical texture value for a block, BCs is a horizontal texture value for a block, i represents a row location within a downscaled luma block, and j represents a column location within a downscaled luma block.

In some examples, texture information present on the current frame is not based on information from previous frames, and it is computed as soon as the frame is available. The example frame statistics aggregator 206 takes output from the example luma level calculator circuitry 202, the Row difference and column difference calculator circuitry 204, and the example 256×128 resized luma layer of an input frame/image. The example frame statistics aggregator 206 aggregates the output data and provides an aggregated output to the example block classifier circuitry 116 of FIG. 1.

Figure 3:
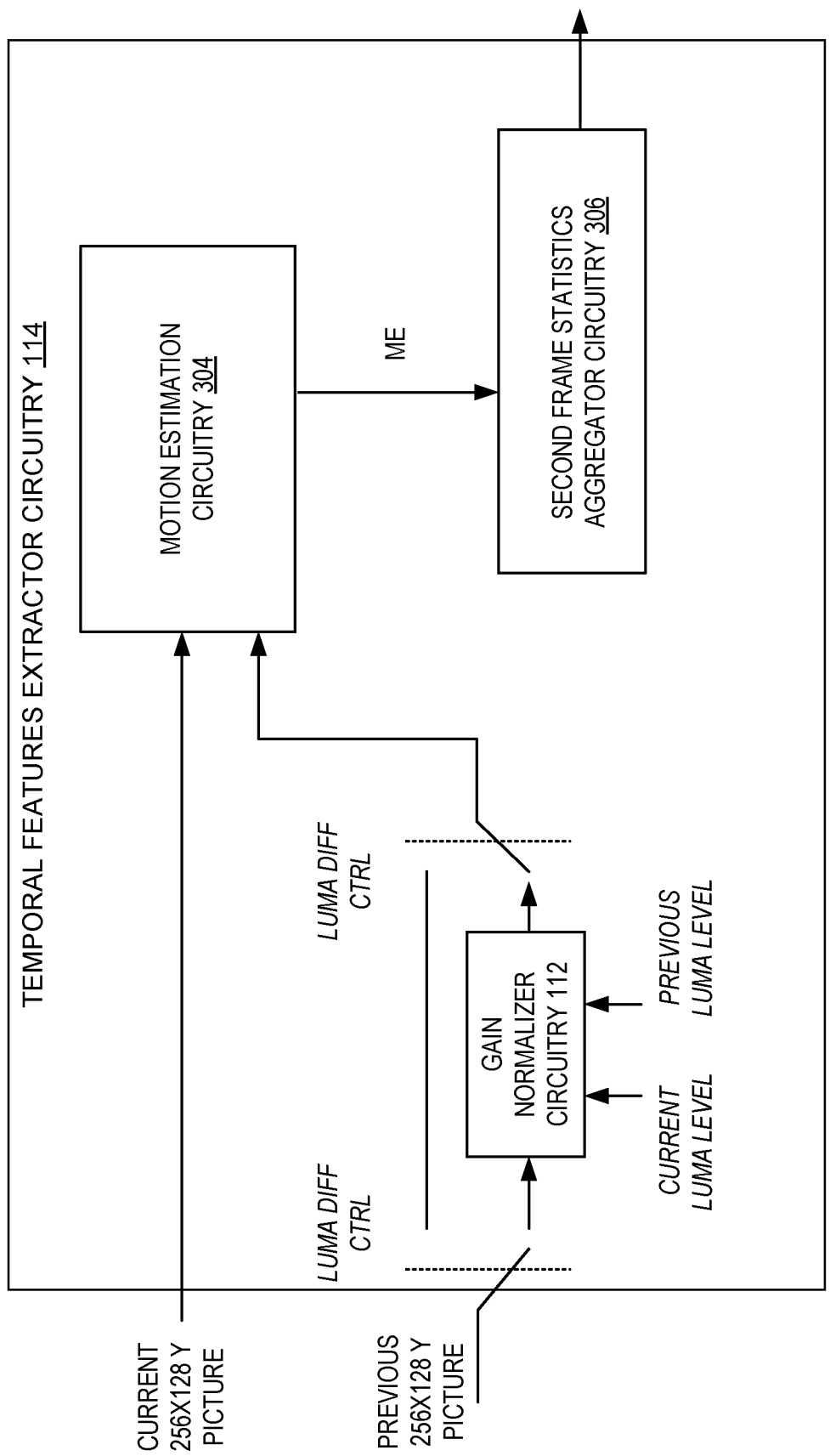
FIG. 3 is a block diagram of example temporal features extractor circuitry included in the video encoding system of FIG. 1.

FIG. 3 is a block diagram of the example temporal features extractor circuitry 114. The example temporal features extractor circuitry 114 of FIG. 3 may be instantiated (e.g., creating an instance of, bring into being for any length of time, materialize, implement, etc.) by processor circuitry such as a central processing unit executing instructions. Additionally or alternatively, the example temporal features extractor circuitry 114 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example temporal features extractor circuitry 114 includes the example gain normalizer circuitry 112 of FIG. 1, example motion estimation circuitry 304, and example second frame statistics aggregator circuitry 306.

The example temporal features extractor circuitry 114 extracts features from a downscaled current frame and a previous frame. The example gain normalizer circuitry 112 compensates a luma level of the previous frame to match the current frame luma level. The gain normalizer circuitry 112 collects luma values of previous and current frames, and based on a difference between the two, compensates the gain. Such calculations are shown in Equation 7 below.

$$\text{gain} = \text{avgLuma}_{previous} - \text{avgLuma}_{current} \quad \text{Equation 7}$$

In Equation 7, avgLuma$_{previous}$ is the average luma value of the previous frame, and avgLuma$_{current}$ is the average luma value of the current frame. Thus, the gain is the difference of the previous frame average luma value and the current frame average luma value.

A reference image can be adjusted based on Equation 8 below. In Equation 8, each luma value of a reference image is adjusted by a gain value to generate a gain compensated reference image.

$$gainCompRef(i, j) = \begin{cases} 0, & \text{if } (Y_{ref}(i, j) < \text{gain}) \\ 255, & \text{if } (Y_{ref}(i, j) > 255 + \text{gain}) \\ (Y_{ref}(i, j) - \text{gain}), & \text{otherwise} \end{cases} \quad \text{Equation 8}$$

In Equation 8, gainCompRef is a function that adjusts a luma value of the reference image given a specific gain value, and Yref(i,j) is a specific location in a luma reference frame.

In some examples, the gain compensated reference is used if a luma level difference condition is met, as shown in Equations 9 below.

Equations 9

$$\text{max\_gain\_dif} = 30$$

$$refFrame = \begin{cases} previousFrame, & \text{if } (\text{abs}(avgLuma_{cur} - avgLuma_{previous}) < \text{max\_gain}) \\ gain\_comp\_frame, & \text{if } (\text{abs}(avgLuma_{cur} - avgLuma_{previous}) \geq \text{max\_gain}) \end{cases}$$

In Equations 9, refFrame stores a determination of whether a previous frame (e.g., previousFrame) or the gain compensated frame (e.g., gain_comp_frame) will be selected. Gain_comp_frame is a luma adjusted reference image and is obtained by applying the gainCompRef function over reference frame pixels defined for a reference frame.

The example motion estimation circuitry 304 returns temporal features used in the ROM analysis. In some examples, the example motion estimation circuitry 304 performs the following series of operations to determine and return the temporal features used in the ROM analysis.

In an example first operation, the example motion estimator circuitry 304 calculates an absolute block difference. An absolute block difference is calculated as a sum of absolute differences between pixels of collocated blocks for current and previous frame (on a 256×128 rescaled domain). Equation 10 shows how the example first step can be calculated.

$$ABD_{(x,y)} = \Sigma_{i=0}^{15} \Sigma_{j=0}^{15} (\text{abs}(\text{current FrameBlock}_{(x,y)}(j,i) - \text{reference FrameBlock}_{(x,y)}(j,i))) \quad \text{Equation 10}$$

In Equation 10, ABD is a comparison value obtained for each block in an image (e.g., one value calculated for each block in an image). Thus, each block from the block from both a reference image and a current image is used to calculate ABD.

Equation 10 describes how to calculate that value based on current and reference blocks. An example second operation includes second operation includes dividing a resized frame into 16×16 blocks. An example third operation includes calculating a zero-motion sum of absolute differences (SAD).

Zero motion refers to a comparison between blocks without motion compensation, and measures how much a picture has changed (e.g., a difference) with respect to a reference image. When motion compensation is applied, blocks associated with a current frame are matched with blocks of a previous frame, reducing a difference between frames. An example fourth operation includes determining a motion vector candidate, as shown in Table 1 below.

TABLE 1

| Block 1 (2, 4) | Block 2 (2, 6) |
| --- | --- |
| Block 3 (−1, 6) | Block 4 |

In Table 1, Blocks 1-4 are representative blocks in an image. Each of Blocks 1-4 are associated with motion vectors (e.g., block 1 has associated motion vector (2, 4)). A motion vector candidate for Block 4 is selected based on the motion vectors of Blocks 1-3.

The motion vector for block 4 is based on Block 4's neighbors (e.g., Blocks 1, Blocks 2, and Blocks 3), with the neighbor that produces a smallest difference (e.g., smallest absolute value of differences) selected. The selected neighbor is used as a starting point for motion estimation (e.g., to further reduce error). This starting point is used as a search center for a motion estimation search.

An example fifth operation includes calculating a SAD for a resulting motion vector. An example sixth operation includes using a vector with a relatively small SAD as a center for a +−8 (e.g., −8 to +7) search, with a step of 2 pixels on each direction. An example seventh operation includes a refinement search of +/−1 pixels. An example eighth operation includes returning a MCBD in 16×16 blocks from a motion estimation process. A MCBD is defined as an absolute difference between collocated blocks in the reference and the motion compensated frame as shown in Equation 11 below.

Equation 11

$$MCBD_{(x,y)} = \sum_{i=0}^{63} \sum_{j=0}^{127} (abs(referenceFrameBlock_{(x,y)}(j, i) - motionCompensatedFrameBlock_{(x,y)}(j, i))$$

In Equation 11, MCBD is a motion compensation block difference, i represents a row location within a block, j represents a column location within a block, referenceFrameBlock is a block without motion compensation applied and, motionCompensatedFrameBlock is the block with motion compensation applied. The example second frame statistics aggregator circuitry 306 receives temporal features to be used in the ROM map from the example motion estimation circuitry 304 and provides the output to the example block classifier circuitry 116. For example, the second frame statistics aggregator circuitry 306 can collect metadata and/or statistics for a block and/or frame, organize the metadata and/or statistics in an array (e.g., in a predefined order), and determine an average block data value. MCBD values for a frame can be averaged to generate one value for an entire frame. The frame value can then be assigned to a predefined position in the metadata array for later consumption by a ROM classifier model.

Figure 4:
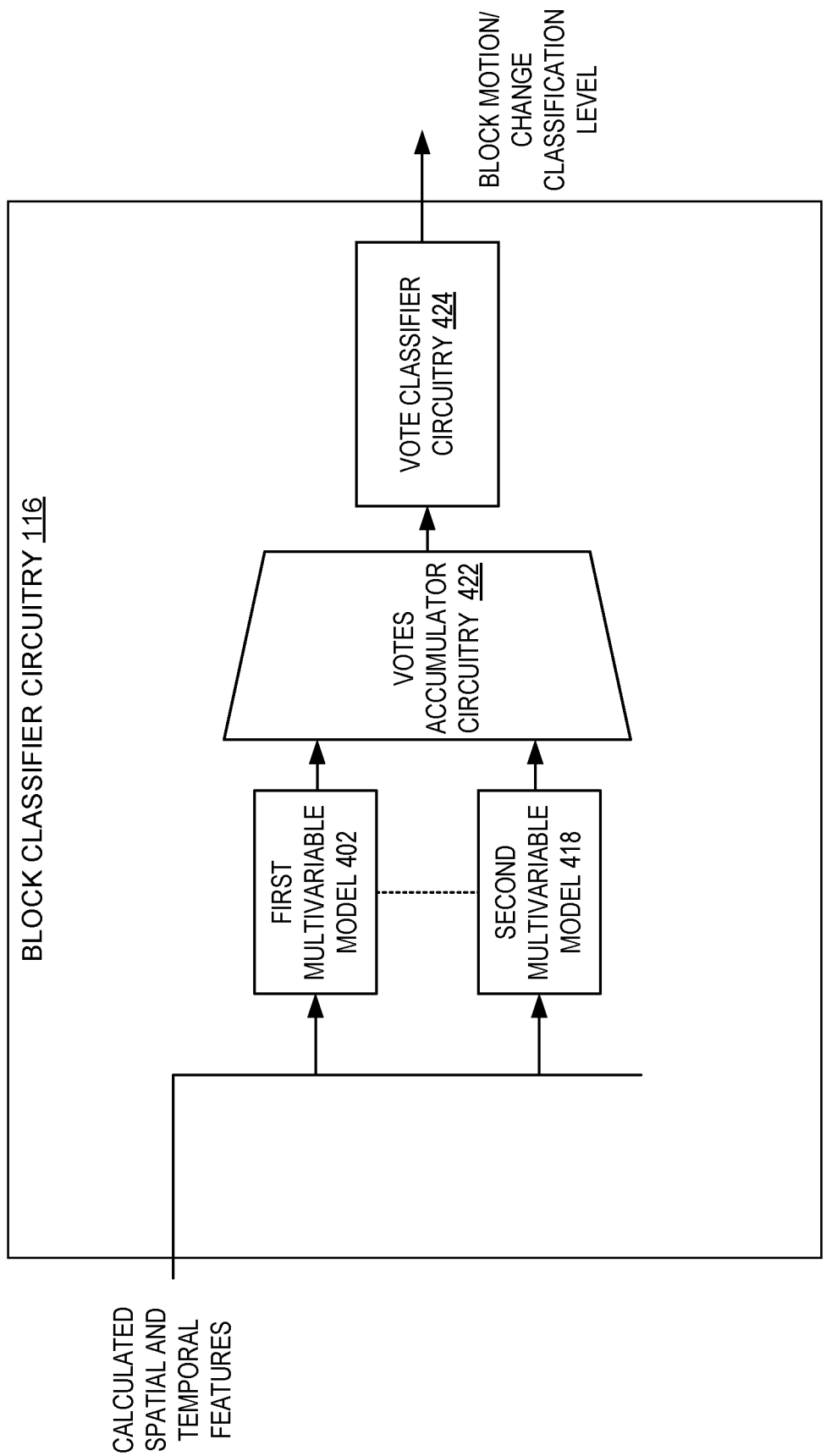
FIG. 4 is a block diagram of example block classifier circuitry included in the video encoding system of FIG. 1.

FIG. 4 includes the example block classifier circuitry 116 of FIG. 1, an example first multivariable model 402, an example second multivariable model 418, example votes accumulator circuitry 422, and example vote classifier circuitry 424.

The example first and second multivariable models 402 and 418 are trained models that receive calculated spatial and temporal features from the example spatial features extractor circuitry 106 and the example temporal features extractor 114. Although two multivariable models are shown in the example of FIG. 4, any number of trained multivariable models (e.g., 2, 10, 50, etc.) could be included in the block classifier circuitry 116.

The example first and second multivariable models 402-418 are trained prior to use on suitable training data (e.g., prior examples of block classifications). Training data (e.g., ground truth data) is collected from a diverse set of video sequences (e.g., videos of many different scenarios). Training data generation is an iterative process, in which each block is assigned a classification value. The classification values are then provided to an encoder to generate an output. In turn, inputs corresponding to selected outputs (e.g., inputs associated with outputs of improved compression efficiency) are added to a training database. Additionally, training data may be filtered by removing outlier data (e.g., data points too far from a mean value). Training data is provided to a suitable machine learning algorithm (e.g., random forest) for generation of a trained model (e.g., the first and second multivariable models 402-418.

The example votes accumulator circuitry 422 receives output from the multivariable models 402-420 and provides a result to the vote classifier circuitry 424. In some examples, the multivariable models 402-420 are part of an ensemble learning method, such as a random forest model. The example vote classifier circuitry 424 provides an output to the delta QP map calculator circuitry 118 of FIG. 1. For example, the output may be based on classification results of each decision tree of the multivariable models 402-420 (e.g., select the most common result).

FIG. 5A is an example of a ROM map that can be generated by the example block classifier circuitry 116. In the example of FIG. 5A, an example output for a 256×128 array is shown (e.g., a 16×8 array output ROM map). Values in FIG. 5A range from 0 to 6, with 0 representing minimal (e.g., insubstantial) change, and 6 representing a relatively high level of change.

FIG. 5B is a ROM map with an average ROM of 1. As the example ROM map of FIG. 5B includes nonzero entries (e.g., there has been change in the video), the ROM map is projected to a full-size frame. To project a ROM map to a full-size frame, a conversion ratio can be calculated based on an original resolution of an image (e.g., before an image is downscaled by the example downscaler 104) and the ROM map. Then, each 16×16 block can be mapped to a corresponding position of the original resolution based the calculated ratios. When two or more ROM blocks share a position, an average value of the two or more ROM blocks sharing that position can be used. FIG. 5C shows the ROM delta QP map generated based on FIG. 5B and Equation 1, Equation 2, and the associated Rules 1-3.

While an example manner of implementing the example video encoding system 100 of FIG. 1 is illustrated in FIGS. 2-5C, one or more of the elements, processes, and/or devices illustrated in FIG. 2-5C may be combined, divided, rearranged, omitted, eliminated, and/or implemented in any other way. Further, the example sequence image buffer 102, the example downscaler 104, the example spatial features extractor circuitry 106, the example frame buffer 108, the example luma difference calculator circuitry 110, the example gain normalizer circuitry 112, the example temporal features extractor circuitry 114, the example block classifier circuitry 116, the example delta QP map calculator circuitry 118, the example macroblock bitrate control circuitry 122, the example encoder 120, the example row and column difference calculator circuitry 204, the example frame statistics aggregator 206, the example motion estimation circuitry 304, the example second frame statistics aggregator circuitry 306, the example first multivariable model 402, the example second multivariable model 418, the example votes accumulator circuitry 422, the example vote classifier circuitry 424 and/or, more generally, the example system 100 of FIG. 1, may be implemented by hardware alone or by hardware in combination with software and/or firmware. Thus, for example, any of sequence image buffer 102, the example downscaler 104, the example spatial features extractor circuitry 106, the example frame buffer 108, the example luma difference calculator circuitry 110, the example gain normalizer circuitry 112, the example temporal features extractor circuitry 114, the example block classifier circuitry 116, the example delta QP map calculator circuitry 118, the example macroblock bitrate control circuitry 122, the example encoder 120, the example row and column difference calculator circuitry 204, the example frame statistics aggregator 206, the example motion estimation circuitry 304, the example second frame statistics aggregator circuitry 306, the example first multivariable model 402, the example second multivariable model 418, the example votes accumulator circuitry 422, the example vote classifier circuitry 424 and/or, more generally, the example system 100 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example system 100 of FIG. 1 may include one or more elements, processes, and/or devices in addition to, or instead of, those illustrated in FIGS. 2-4, and/or may include more than one of any or all of the illustrated elements, processes and devices.

Figure 6:
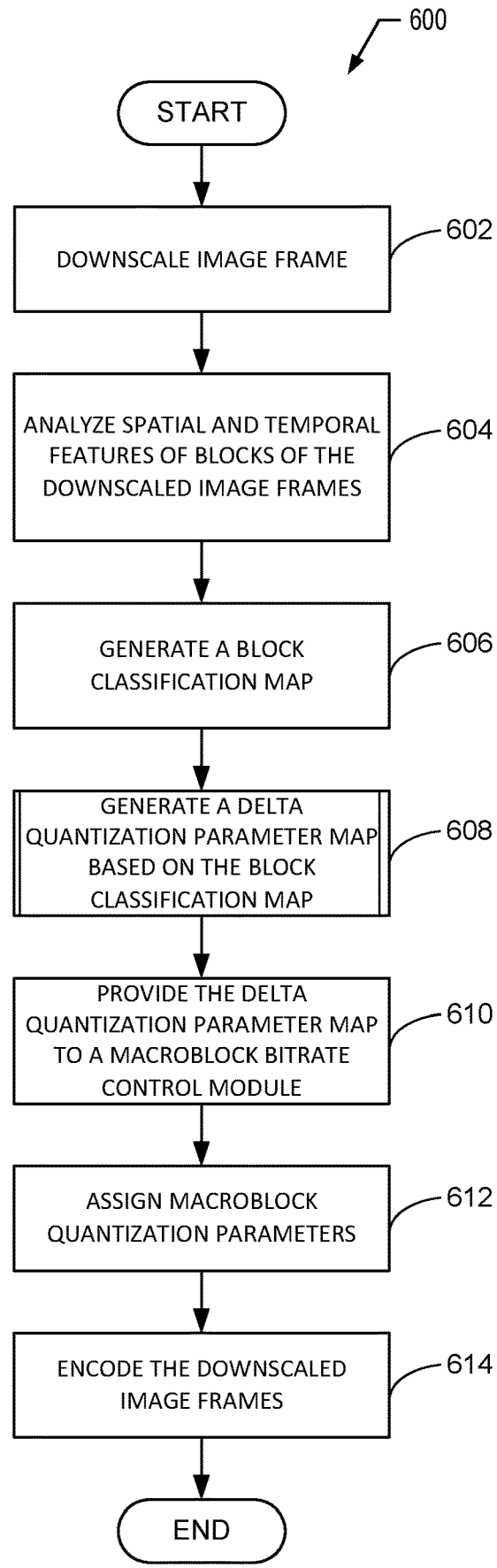
FIG. 6 is a flowchart representative of example machine readable instructions and/or example operations that may be executed by example processor circuitry to implement the video encoding system of FIG. 1.
Figure 7:
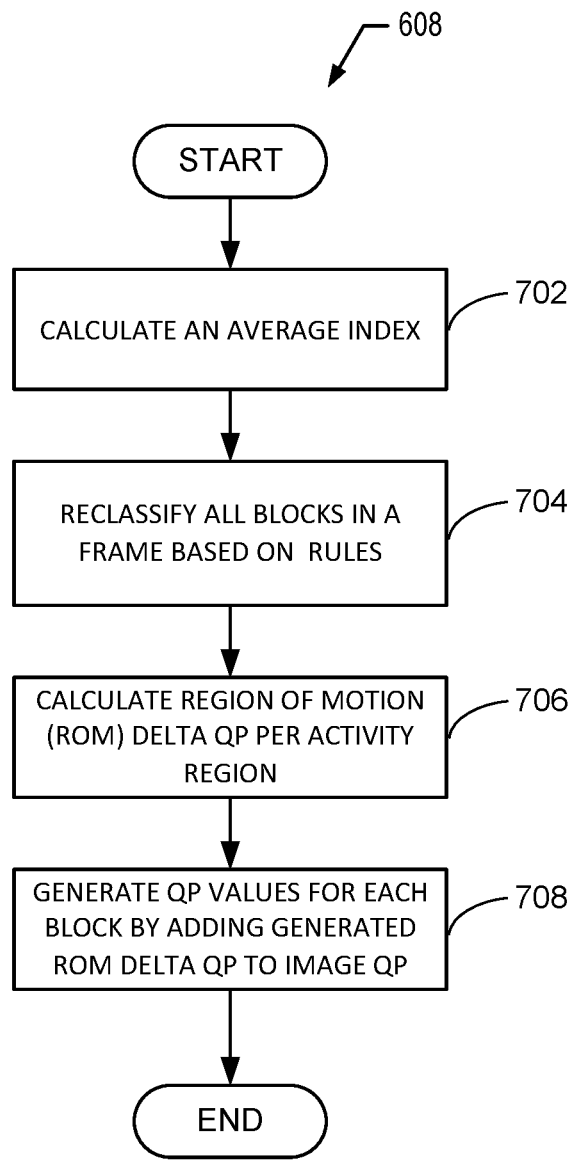
FIG. 7 is a flowchart representative of example machine readable instructions and/or example operations that may be executed by example processor circuitry to implement the video encoding system of FIG. 1.

A flowchart representative of example hardware logic circuitry, machine readable instructions, hardware implemented state machines, and/or any combination thereof for implementing the system 100 of FIG. 1 is shown in FIGS. 6-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 6-7, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 1-4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to encode video with region of motion detection. The machine readable instructions and/or the operations 600 of FIG. 6 begin at block 602, at which the downscaler 104 of FIG. 1 can downscale an image frame. For example, the downscaler 104 of FIG. 1 can downscale a high-resolution image (e.g., 1920×1080) to a 256×128 downscaled image.

At block 604, the example spatial features extractor circuitry 106 of FIG. 1 and the example temporal features extractor circuitry 114 of FIG. 1 analyze spatial and temporal features of the downscaled image frame. For example, the spatial features extractor circuitry 106 of FIG. 1 and the example temporal features extractor circuitry 114 of FIG. 1 may extract luma features and ROM change information from the example downscaled image frame.

At block 606, the example block classifier circuitry 116 of FIG. 1 generates a block classification map. For example, the block classifier circuitry 116 of FIG. 1 can generate a block classification map including a value for each element of a 16×8 two-dimensional array, the values ranging from 0-6 and corresponding to a 16×16 block in the downscaled frame.

At block 608, the example delta QP map calculator circuitry 118 of FIG. 1 generates a delta QP parameter map based on the block classification map. The instructions of block 608 are described in further detail below in relation to FIG. 7.

At block 610, the delta QP map calculator circuitry 118 of FIG. 1 provides the delta QP map to the example macroblock bitrate control circuitry 122 of FIG. 1. The example macroblock bitrate control can assign macroblock quantization parameters at block 612. At block 613, the example encoder 120 of FIG. 1 encodes the downscaled image frames. For example, the downscaled image frames can be encoded based on the delta QP map. The machine readable instructions and/or the operations 600 of FIG. 6 end.

FIG. 7 is a flowchart representative of example machine readable instructions and/or example operations 608 that may be executed and/or instantiated by processor circuitry to generate a delta QP parameter map based on a block classification map. The machine readable instructions and/or the operations 608 of FIG. 7 begin at block 702, at which the example delta QP map calculator circuitry 118 of FIG. 1 calculates an average index. For example, the delta QP map calculator circuitry 118 of FIG. 1 can calculate an average index based on Equation 1 above.

At block 704, the example delta QP map calculator circuitry 118 of FIG. 1 can reclassify all blocks in a frame based on rules. For example, the delta QP map calculator circuitry 118 of FIG. 1 can reclassify blocks in a frame based on Equations 1, 2, and Rules 1-3 above.

At block 706, the example delta QP map calculator circuitry 118 of FIG. 1 calculates a ROM delta QP per activity region. For example, the delta QP map calculator circuitry 118 of FIG. 1 can calculate a ROM delta QP per activity region based on Equation 2 above.

At block 708, the example delta QP map calculator circuitry 118 of FIG. 1 can generate a QP value for each block by adding the generated ROM delta QP to the image QP. The instructions of FIG. 7 end.

Figure 8:
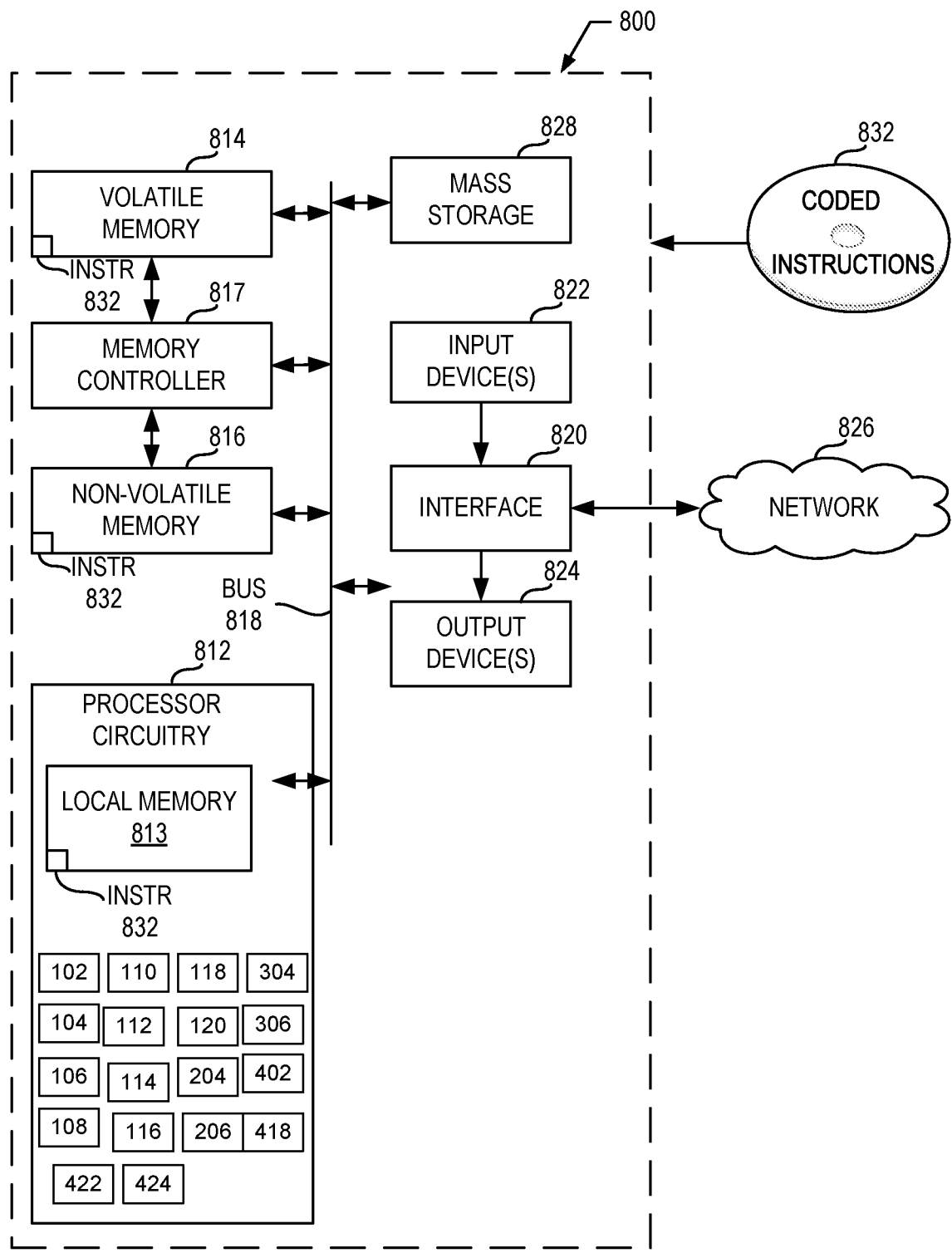
FIG. 8 is a block diagram of an example processing platform including processor circuitry structured to execute the example machine readable instructions and/or the example operations of FIGS. 6 and/or 7 to implement the video encoding system of FIG. 1.

FIG. 8 is a block diagram of an example processor platform 400 structured to execute and/or instantiate the machine readable instructions and/or the operations of FIGS. 6-7 to implement the apparatus of FIGS. 1-5C. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example sequence image buffer 102, the example downscaler 104, the example spatial features extractor circuitry 106, the example frame buffer 108, the example luma difference calculator circuitry 110, the example gain normalizer circuitry 112, the example temporal features extractor circuitry 114, the example block classifier circuitry 116, the example delta QP map calculator circuitry 118, the example macroblock bitrate control circuitry 122, the example encoder 120, the example Rs and Cs calculator circuitry 204, the example frame statistics aggregator 206, the example motion estimation circuitry 304, the example second frame statistics aggregator circuitry 306, the example first multivariable model 402, the example second multivariable model 418, the example votes accumulator circuitry 422, the example vote classifier circuitry 424 and/or, more generally, the example system 100 of FIG. 1.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 832, which may be implemented by the machine readable instructions of FIGS. 6-7, may be stored in the mass storage device 828, in the volatile memory 814, in the non-volatile memory 816, and/or on a removable non-transitory computer readable storage medium such as a CD or DVD.

Figure 9:
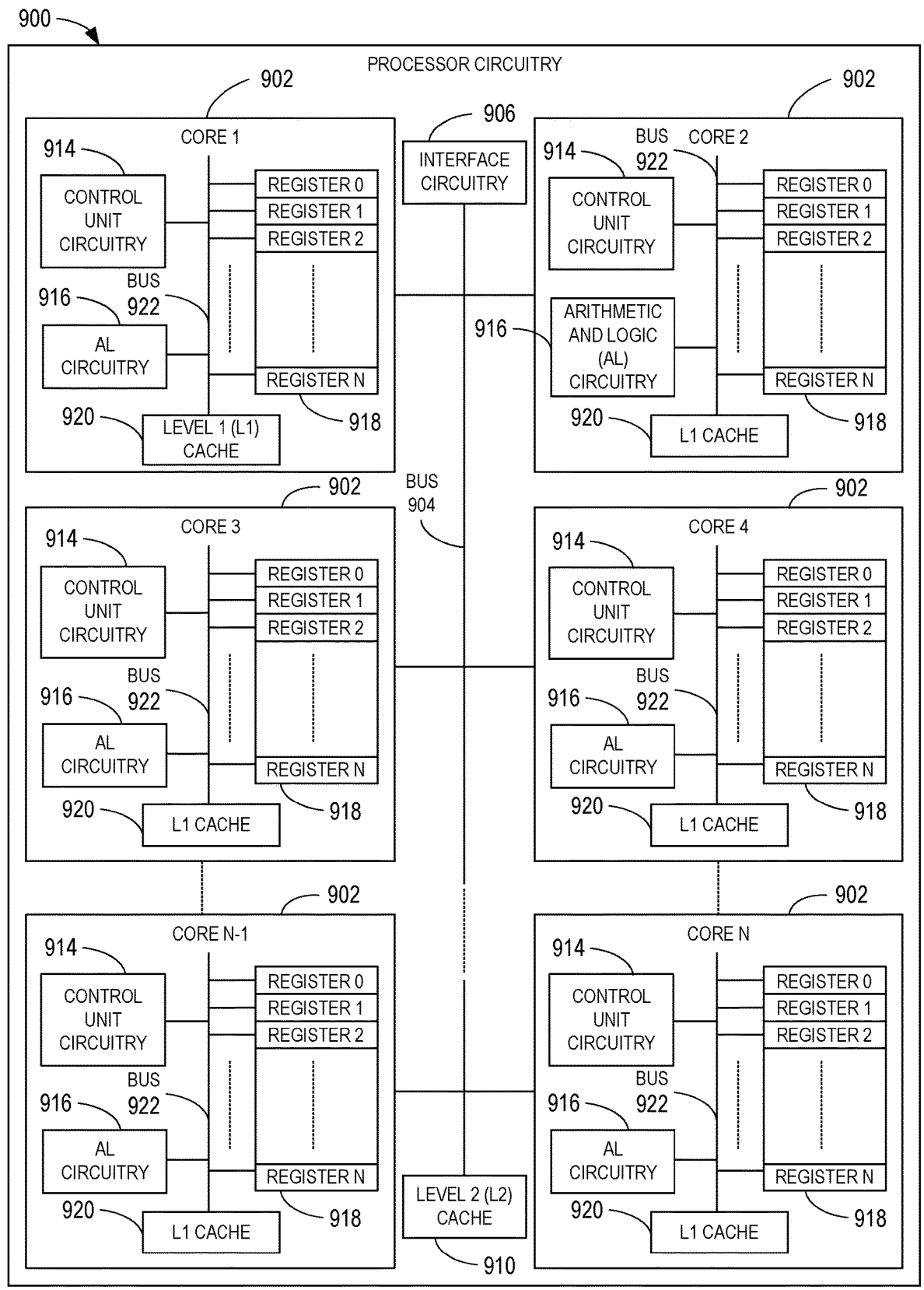
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a general purpose microprocessor 900. The general purpose microprocessor circuitry 900 executes some or all of the machine readable instructions of the flowchart of FIGS. 6-7 to effectively instantiate the system 100 of FIG. 1 as logic circuits to perform the operations corresponding to those machine readable instructions. In some such examples, the circuitry of FIG. 1 is instantiated by the hardware circuits of the microprocessor 900 in combination with the instructions. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6-7.

The cores 902 may communicate by a first example bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
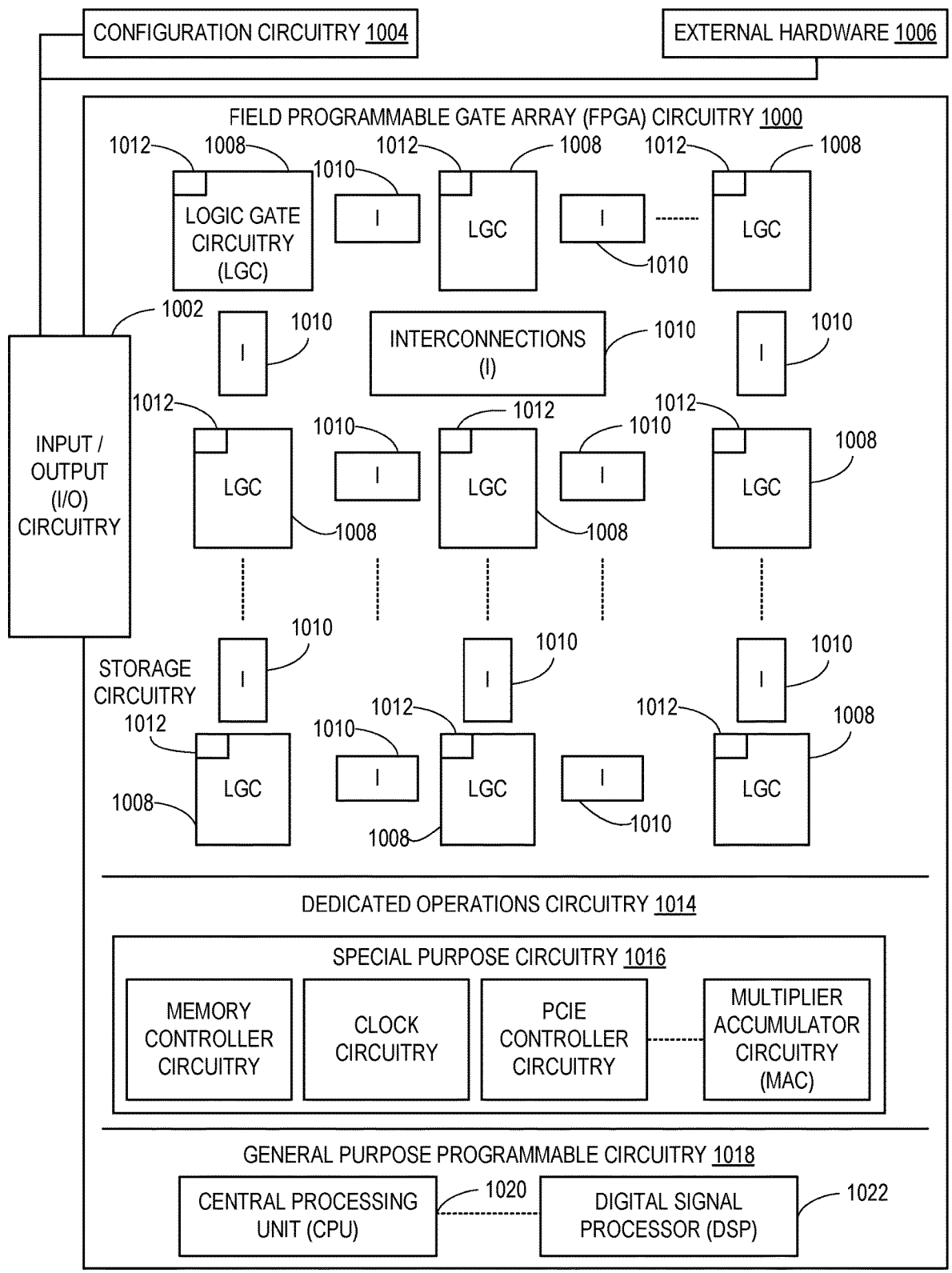
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIGS. 6-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIGS. 6-7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIGS. 6-7. As such, the FPGA circuitry 1000 may be structured to effectively instantiate some or all of the machine readable instructions of the flowchart of FIGS. 6-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 6-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIGS. 6-7 may be executed by one or more of the cores 1002 of FIG. 10, a second portion of the machine readable instructions represented by the flowchart of FIGS. 6-7 may be executed by the FPGA circuitry 1000 of FIG. 10, and/or a third portion of the machine readable instructions represented by the flowchart of FIGS. 6-7 may be executed by an ASIC. It should be understood that some or all of the circuitry of FIGS. 1-5C may, thus, be instantiated at the same or different times. Some or all of the circuitry may be instantiated, for example, in one or more threads executing concurrently and/or in series. Moreover, in some examples, some or all of the circuitry of FIGS. 1-5C may be implemented within one or more virtual machines and/or containers executing on the microprocessor.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
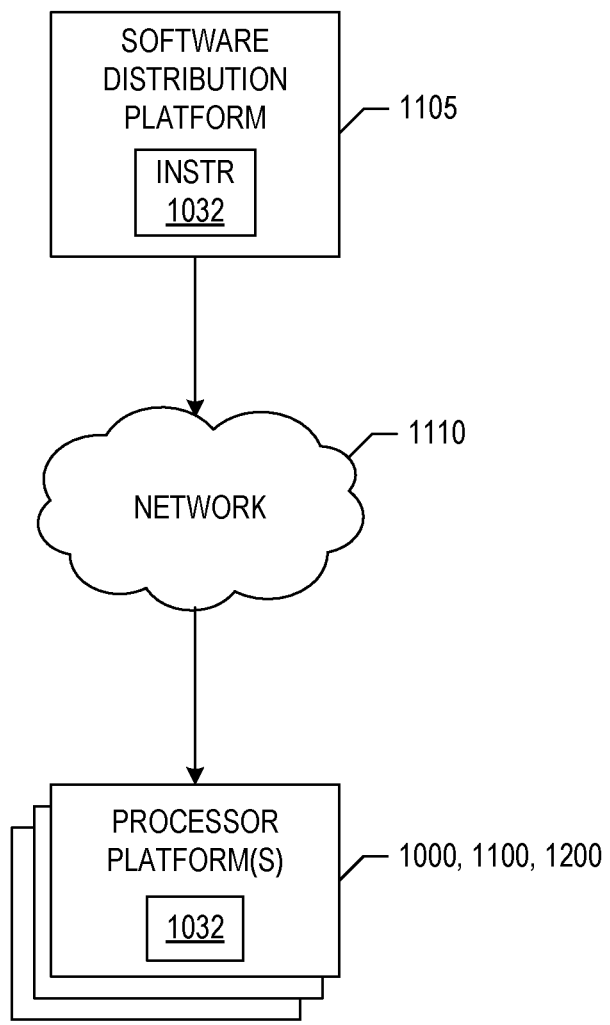
FIG. 11 is a block diagram of an example software distribution platform (e.g., one or more servers) to distribute software (e.g., software corresponding to the example machine readable instructions of FIGS. 6 and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 1132, which may correspond to the example machine readable instructions 600, 700 of FIGS. 6-7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 832 of FIG. 8 may be downloaded to the example processor platform 800, which is to execute the machine readable instructions 832 to implement the example system 100 of FIG. 1. In some examples, one or more servers of the software distribution platform 1105 periodically offer, transmit, and/or force updates to the software (e.g., the example machine readable instructions 600, 700 of FIGS. 6-7) to ensure improvements, patches, updates, etc., are distributed and applied to the software at the end user devices.

From the foregoing, it will be appreciated that example systems, methods, apparatus, and articles of manufacture have been disclosed that encode video with region of motion detection. Disclosed systems, methods, apparatus, and articles of manufacture improve upon existing coding pipelines by improving encoded video quality. Rather than having a single quantization parameter (QP) for an entire frame (e.g., an image), examples disclosed herein vary the number of bits used to encode portions of the frame by varying QP on a block-by-block basis within a frame. Furthermore, examples disclosed herein improve the efficiency of a computing device by encoding video with little/no added delay (e.g., reduced analysis delay), providing recommendations for QP values based on current and previous frame data in a simplified manner, and enabling generation of a delta QP map from indexed recommendation statistics.

Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to encode video with region of motion detection are disclosed herein. Further examples and combinations thereof include the following:

Example 1 includes an apparatus comprising at least one memory, instructions, and processor circuitry to execute the instructions to process features extracted from first and second downscaled image frames to determine block classifications for respective blocks of the first and the second downscaled image frames, generate a map based on the block classifications, the map including values representative of amounts of change associated with blocks of the second downscaled image frame and corresponding blocks of the first downscaled image frame, and adjust a quantization parameter of a full-scale image frame based on the map, the full-scale image frame corresponding to the at least one of the first or the second downscaled image frames.

Example 2 includes the apparatus of example 1, wherein the features include spatial and temporal features based on data from a luminance layer of the first downscaled image frame and the second downscaled image frame.

Example 3 includes the apparatus of example 1, wherein the processor circuitry is to execute the instructions to adjust a first value of a first block of the second downscaled image frame based on a second block of the second downscaled image frame collocated to the first block of the downscaled image frame.

Example 4 includes the apparatus of example 1, wherein the features include information on luminance differences between rows and columns of pixels of the second image frame.

Example 5 includes the apparatus of example 1, wherein the blocks are classified based on votes received from a plurality of multivariable models.

Example 6 includes the apparatus of example 1, wherein the processor circuitry is to execute the instructions to encode the full-scale image frame based on the adjusted quantization parameter.

Example 7 includes the apparatus of example 1, wherein the apparatus is a camera.

Example 8 includes a non-transitory computer readable medium comprising instructions, which, when executed, cause processor circuitry to at least process features extracted from first and second downscaled image frames to determine block classifications for respective blocks of the first and the second downscaled image frames, generate a map based on the block classifications, the map including values representative of amounts of change associated with blocks of the second downscaled image frame and corresponding blocks of the first downscaled image frame, and adjust a quantization parameter of a full-scale image frame based on the map, the full-scale image frame corresponding to the at least one of the first or the second downscaled image frames.

Example 9 includes the non-transitory computer readable medium of example 8, wherein the features include spatial and temporal features based on data from a luminance layer of the first downscaled image frame and the second downscaled image frame.

Example 10 includes the non-transitory computer readable medium of example 8, wherein the instructions, when executed, cause processor circuitry to adjust a first value of a first block of the second downscaled image frame based on a second block of the second downscaled image frame collocated to the first block of the downscaled image frame.

Example 11 includes the non-transitory computer readable medium of example 8, wherein the features include information on luminance differences between rows and columns of pixels of the second image frame.

Example 12 includes the non-transitory computer readable medium of example 8, wherein the blocks are classified based on votes received from a plurality of multivariable models.

Example 13 includes the non-transitory computer readable medium of example 8, wherein the processor circuitry is to execute the instructions to encode the full-scale image frame based on the adjusted quantization parameter.

Example 14 includes the non-transitory computer readable medium of example 8, wherein the processor circuitry is associated with a camera.

Example 15 includes a method comprising processing, by executing an instruction with processor circuitry, features extracted from first and second downscaled image frames to determine block classifications for respective blocks of the first and the second downscaled image frames, generating, by executing an instruction with the processor circuitry, a map based on the block classifications, the map including values representative of amounts of change associated with blocks of the second downscaled image frame and corresponding blocks of the first downscaled image frame, and adjusting, by executing an instruction with the processor circuitry, a quantization parameter of a full-scale image frame based on the map, the full-scale image frame corresponding to the at least one of the first or the second downscaled image frames.

Example 16 includes the method of example 15, wherein the features include spatial and temporal features based on data from a luminance layer of the first downscaled image frame and the second downscaled image frame.

Example 17 includes the method of example 15, further including adjusting a first value of a first block of the second downscaled image frame based on a second block of the second downscaled image frame collocated to the first block of the downscaled image frame.

Example 18 includes the method of example 15, wherein the features include information on luminance differences between rows and columns of pixels of the second image frame.

Example 19 includes the method of example 15, wherein the blocks are classified based on votes received from a plurality of multivariable models.

Example 20 includes the method of example 15, further including encoding the full-scale image frame based on the adjusted quantization parameter.

Example 21 includes the method of example 15, wherein the processor circuitry is associated with a camera.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
instructions; and
processor circuitry to execute the instructions to:
process features extracted from first and second downscaled image frames to determine block classifications for respective blocks of the first and the second downscaled image frames, the features including at least one of (i) spatial and temporal features based on data from a luminance layer of the first downscaled image frame and the second downscaled image frame, or (ii) information on luminance differences between rows and columns of pixels of the second downscaled image frame;
generate a map based on the block classifications, the map including values representative of amounts of change associated with blocks of the second downscaled image frame and corresponding blocks of the first downscaled image frame; and
adjust a quantization parameter of a full-scale image frame based on the map, the full-scale image frame corresponding to the at least one of the first or the second downscaled image frames.

2. The apparatus of claim 1, wherein the processor circuitry is to execute the instructions to adjust a first value of a first block of the second downscaled image frame based on a second block of the first downscaled image frame collocated to the first block of the second downscaled image frame.

3. The apparatus of claim 1, wherein the blocks are classified based on votes received from a plurality of multivariable models.

4. The apparatus of claim 1, wherein the processor circuitry is to execute the instructions to encode the full-scale image frame based on the adjusted quantization parameter.

5. The apparatus of claim 1, wherein the apparatus is a camera.

6. At least one non-transitory computer readable medium comprising instructions that, when executed, cause processor circuitry to at least:
process features extracted from first and second downscaled image frames to determine block classifications for respective blocks of the first and the second downscaled image frames, the blocks to be classified based on votes received from a plurality of multivariable models;
generate a map based on the block classifications, the map including values representative of amounts of change associated with blocks of the second downscaled image frame and corresponding blocks of the first downscaled image frame; and
adjust a quantization parameter of a full-scale image frame based on the map, the full-scale image frame corresponding to the at least one of the first or the second downscaled image frames.

7. The at least one non-transitory computer readable medium of claim 6, wherein the features include spatial and temporal features based on data from a luminance layer of the first downscaled image frame and the second downscaled image frame.

8. The at least one non-transitory computer readable medium of claim 6, wherein the instructions cause the processor circuitry to adjust a first value of a first block of the second downscaled image frame based on a second block of the first downscaled image frame collocated to the first block of the second downscaled image frame.

9. The at least one non-transitory computer readable medium of claim 6, wherein the features include information on luminance differences between rows and columns of pixels of the second downscaled image frame.

10. The at least one non-transitory computer readable medium of claim 6, wherein the instructions cause the processor circuitry to encode the full-scale image frame based on the adjusted quantization parameter.

11. The non-transitory computer readable medium of claim 6, wherein the processor circuitry is included in a camera.

12. A method comprising:
adjusting, by executing an instruction with processor circuitry, a first value of a first block of a second downscaled image frame based on a second block of a first downscaled image frame collocated to the first block of the second downscaled image frame;
processing, by executing an instruction with the processor circuitry, features extracted from the first and the second downscaled image frames to determine block classifications for respective blocks of the first and the second downscaled image frames;
generating, by executing an instruction with the processor circuitry, a map based on the block classifications, the map including values representative of amounts of change associated with blocks of the second downscaled image frame and corresponding blocks of the first downscaled image frame; and
adjusting, by executing an instruction with the processor circuitry, a quantization parameter of a full-scale image frame based on the map, the full-scale image frame corresponding to the at least one of the first or the second downscaled image frames.

13. The method of claim 12, wherein the features include spatial and temporal features based on data from a luminance layer of the first downscaled image frame and the second downscaled image frame.

14. The method of claim 12, wherein the features include information on luminance differences between rows and columns of pixels of the second downscaled image frame.

15. The method of claim 12, wherein the blocks are classified based on votes received from a plurality of multivariable models.

16. The method of claim 12, further including encoding the full-scale image frame based on the adjusted quantization parameter.

17. The method of claim 12, wherein the processor circuitry is included in a camera.

* * * * *